May 13, 1952      H. A. WEBB      2,596,188

FOOTWEAR

Filed Oct. 18, 1949      6 Sheets-Sheet 1

INVENTOR.
Harry A. Webb
BY
Mason, Kolehmainen, Rathburn & Wyss
Att'ys

May 13, 1952 — H. A. WEBB — 2,596,188
FOOTWEAR
Filed Oct. 18, 1949 — 6 Sheets-Sheet 2

INVENTOR.
Harry A. Webb
BY Mason, Kolehmainen, Rathburn & Wyss
Att'ys

May 13, 1952 — H. A. WEBB — 2,596,188
FOOTWEAR
Filed Oct. 18, 1949 — 6 Sheets-Sheet 3

INVENTOR.
Harry A. Webb
BY Mason, Kolehmainen, Rathburn & Wyss
Attys

May 13, 1952 H. A. WEBB 2,596,188
FOOTWEAR
Filed Oct. 18, 1949 6 Sheets-Sheet 4

INVENTOR.
Harry A. Webb
BY Mason, Kolehmainen, Rathburn & Wyss
Attys

May 13, 1952     H. A. WEBB     2,596,188
FOOTWEAR Filed Oct. 18, 1949     6 Sheets-Sheet 5

INVENTOR.
Harry A. Webb
BY
Mason, Kolehmainen, Rathburn & Wyss
Att'ys

May 13, 1952  H. A. WEBB  2,596,188
FOOTWEAR
Filed Oct. 18, 1949  6 Sheets-Sheet 6

INVENTOR.
Harry A. Webb
BY Mason, Kolehmainen, Rathburn & Wyss
Att'ys

Patented May 13, 1952

2,596,188

UNITED STATES PATENT OFFICE 2,596,188

FOOTWEAR

Harry A. Webb, Mount Carmel, Conn., assignor to Parva Products Company, Chicago, Ill., a corporation of Delaware Application October 18, 1949, Serial No. 122,063

18 Claims. (Cl. 36—11.5)

This invention relates to footwear, more particularly to articles of footwear such as sandals, slippers and the like, and the invention has for an object the provision of a sandal or light article of footwear which is of one piece, economical of construction, is easy to apply to the foot, is comfortable to wear and is of pleasing appearance.

Various types of sandals and similar articles of footwear have been proposed in which a plurality of straps for securing the sandal to the foot are sewn, vulcanized or otherwise secured to the sole portion or are adapted to be laced through suitable apertures in the sole portion, and various arrangements have been proposed for buckling, lacing, tying or similarly securing the straps about the foot and ankle of the wearer. Such prior arrangements, however, are either excessively bulky in construction and therefore difficult to pack or carry when not in use, or are expensive to construct, difficult to apply to the foot, or unattractive in appearance.

It is therefore a further object of this invention to provide a sandal or the like which may be readily manufactured in the form of a single flat element and which remains in flat condition except when applied to the foot.

Another object of the invention is to provide an article of this character which may be quickly and economically molded in flat form or stamped from a single sheet of material.

Still another object of the invention is the provision of a one piece sandal which is normally flat and which includes peripheral portions adapted to be drawn upwardly over the foot after application of the foot thereto in order to provide foot engaging latticework portions.

A still further object of the invention is to provide a normally flat one piece article which may be readily converted by the wearer after application of the foot thereto, into a sandal or the like, including latticework portions which firmly secure the sandal to the foot.

A still further object of the invention is to provide sandals or the like which may be readily packed and transported for beach wear, locker room wear, and similar purposes, and which are of pleasing appearance when applied to the foot.

In carrying out the invention in one form, a sandal or like article of footwear is provided which comprises a flat sole portion peripherally shaped to conform to the outline of the foot and having a plurality of narrow strands integral with the sole portion and extending outwardly from the periphery of the sole portion in the plane thereof. A continuous outer strand formed integrally with the narrow strands and the sole portion is provided extending around at least a portion of the periphery of the sole portion in spaced relation thereto, and integrally terminating some or all of the narrow strands. Suitable fastening means are likewise provided for securing spaced portions of the outer strand together over the foot of the wearer so as to cause the narrow strands to form upwardly extending foot engaging latticeworks.

For a more complete understanding of the invention reference should now be had to the drawings, in which.

Figure 1:
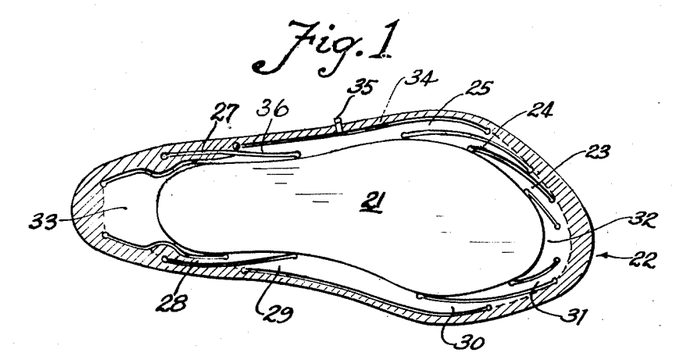
Fig. 1 is a plan view of a sandal or like article of footwear in its normal flat condition.
Figure 2:
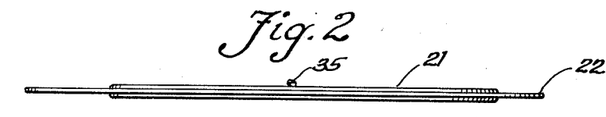
Fig. 2 is a side elevational view of the sandal in its flat condition.

Referring first to the embodiment of the invention shown in Figs. 1 to 5, inclusive, the invention is shown as embodied in a sandal comprising a flat sole portion 21 shaped to conform substantially to the outline of a human foot and having extending therefrom a peripheral flange 22 which, as shown best in Fig. 2, is preferably of lesser thickness than the sole portion 21 and extends outwardly from the periphery thereof approximately midway between the upper and lower surfaces of the sole portion. As shown best in Fig. 1, the flange portion 22 is provided with a plurality of elongate apertures or slots which define narrow strands 23, 24, 25, 26, 27, 28, 29, 30, 31, which strands are integral with the sole portion 21 and extend angularly outward therefrom. In addition, other apertures or slots, which are located adjacent the toe and heel ends of the sole portion 21, provide relatively wide toe and heel portions 32 and 33, the purpose of which will be more fully explained hereinafter. The various narrow strands 23 to 31, inclusive, as well as the toe and heel portions 32 and 33, terminate, as shown in Fig. 1, in a continuous outer strand or edge portion 34, which extends about the periphery of the sole portion 21 in spaced relation thereto.

For clarity of illustration, the outer strand 34 has been shaded in Fig. 1 and suitable broken lines have been employed to illustrate more clearly the inner configuration of the outer strand 34, but it will be understood that the shading and the broken lines are used solely for clarity of illustration and will not be found in the finished product. Suitably secured to the outer strand 34 on one side of the sole portion 21 is a fastening means 35, which, as shown best in Figs. 3 and 4, is in the form of a metal hook.

The sandal when constructed as shown in Figs. 1 and 2 is preferably formed of suitable rubber or rubber-like material, although other relatively resilient materials such, for example, as elastic fabrics may be employed if desired. The sandal may be formed by suitable molding or stamping operations, and the strands 23 to 31, inclusive, may be provided with any desired cross section, i. e., rectangular, circular or hexagonal, for example. Furthermore, while the flange portion 22, from which the strands 23 to 31, inclusive, the toe and heel portions 32 and 33 and the continuous outer strand 34 are formed, has been shown as being of lesser thickness than the sole portion 21, it will, of course, be understood that a uniform thickness may be provided throughout the entire sandal if desired. Likewise, if desired, a thickened heel portion may be provided on the sole portion 21. The sandal, as shown in Figs. 1 and 2, constitutes a complete article of footwear and may be readily packed or carried in beach bags and the like, or even in pockets or pocketbooks, and will occupy a minimum space.

Figure 3:
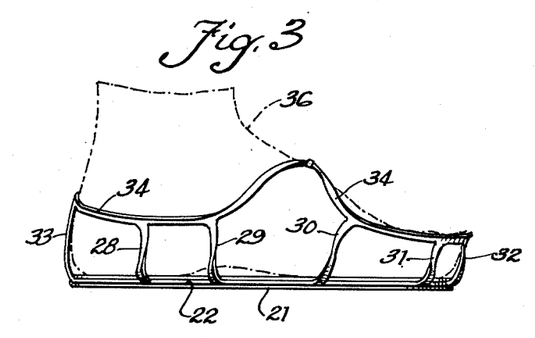
Fig. 3 is a side elevational view of the sandal of Figs. 1 and 2 when applied to the foot of a wearer, the foot being shown in broken lines to indicate the application of the sandal thereto.
Figure 4:
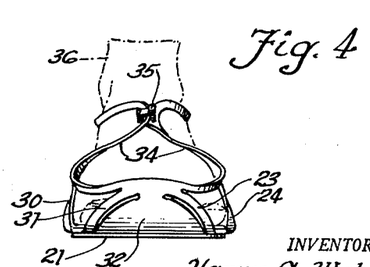
Figs. 4 and 5 are respectively front and rear views of the sandal as applied to the foot of a wearer.
Figure 5:
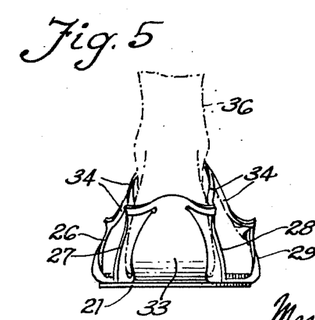

When it is desired to apply the sandal to the foot, it is necessary only to place the foot on the sole portion, as indicated by the broken lines 36 in Fig. 3, and then to draw opposed side portions of the continuous strip 34 upwardly and over the instep of the foot so as to hook the fastening means 35 about the oppositely disposed portion of the outer strand 34. As shown in Fig. 3, this application of the sandal to the foot results in the strands 28, 29, 30 and 31 being drawn upwardly so as to provide a latticework along the side of the foot, and it will be understood that the strands 23, 24, 26 and 27 will be similarly disposed on the opposite side of the foot. Likewise, as shown best in Figs. 4 and 5, the toe and heel portions 32 and 35 will be drawn upwardly to provide toe and heel protecting elements which are securely held in position by the strand 34. It will thus be apparent that a complete and attractive sandal is provided which may be readily applied to and removed from the foot while snugly conforming to the shape of the foot, and which provides an attractive and pleasing appearance.

Figure 6:
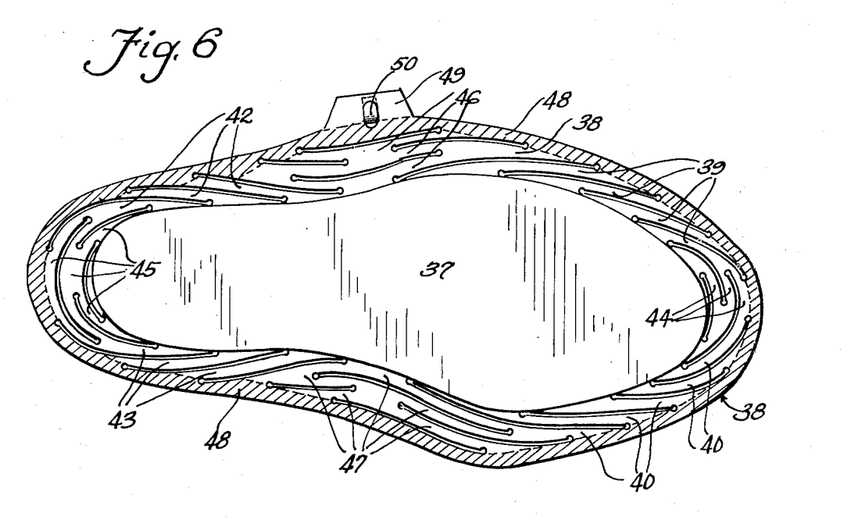
Fig. 6 is a plan view of another form of sandal embodying the present invention and in the normal flat condition.
Figure 7:
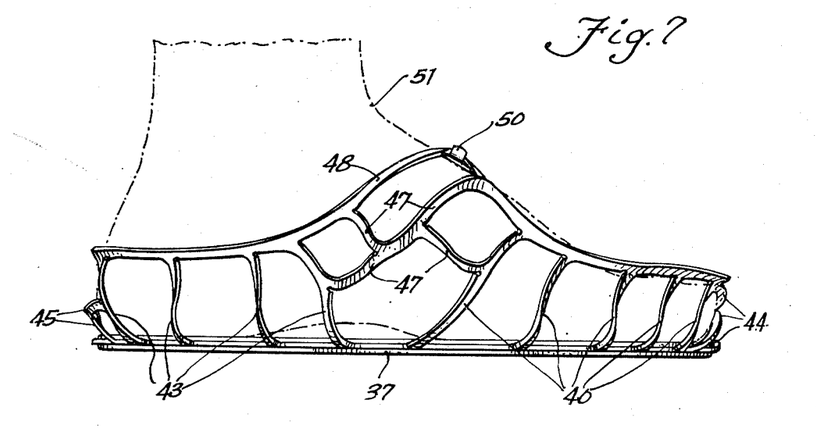
Fig. 7 is a side elevational view showing the sandal of Fig. 6 applied to the foot of a wearer.
Figure 8:
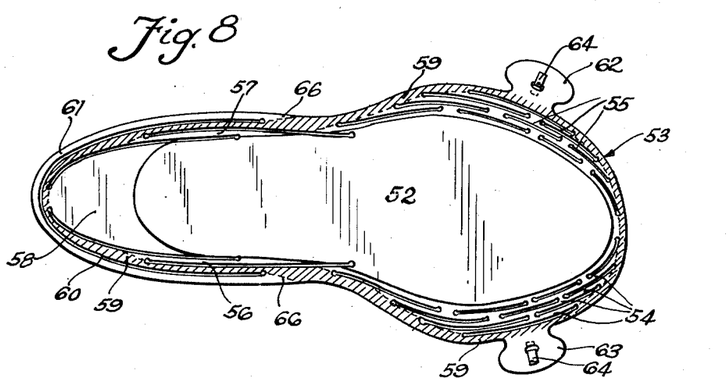
Fig. 8 is a plan view of still another sandal embodying the present invention in the normal flat condition.

In the embodiment of the invention shown in Figs. 6 and 7, the sole portion 37 is provided with a peripheral flange 38, which flange is slotted or apertured along opposite sides of the forward portion of the foot to provide a plurality of obliquely forwardly extending strands 39 and 40 and is provided adjacent the rear portion thereof with a plurality of slots or apertures which define obliquely rearwardly extending strands 42 and 43. In this embodiment of the invention additional slots or apertures are provided adjacent the toe and heel ends of the sole portion to provide a plurality of toe and heel encircling strands 44 and 45 respectively. In addition, the portions of the flange 38 intermediate the forward and rear end portions are provided with additional slots or apertures which define additional strands 46 and 47, the purpose of which will be more fully apparent from a consideration of Fig. 7.

As in the previously described embodiment of the invention, a continuous outer strand 48 is provided, which again is shaded and partially defined in Fig. 6 by broken lines, and which extends about the periphery of the sole portion 37 in spaced relation thereto and integrally terminates the various narrow strands. Extending outwardly from one side of the continuous strand 48 is an ear or tab 49 for supporting a hook or similar fastening means 50. When the foot of the wearer, indicated by the broken lines 51 in Fig. 7, is placed on the sole portion 37, and the continuous strand 48 drawn upwardly from opposite sides so as to cause the hook 50 to engage an oppositely disposed portion of the outer strand 48, a completed sandal will be formed, as shown in Fig. 7, the strands 40 and 43 forming forward and rear side latticeworks, the strands 44 and 45, respectively, forming open work toe and heel portions, and the intermediate strands 47 forming instep embracing latticeworks, it being understood, of course, that the similar strands on the opposite side of the sandal form similarly disposed latticeworks.

In the embodiment of the invention shown in Figs. 8 to 11, inclusive, a somewhat different arrangement of foot engaging strands is employed for forming both the heel and toe portions of the sandal. As shown, the sandal in this embodiment of the invention includes a sole portion 52 surrounded by a peripherally extending flange 53. The forward portion of the flange 53 is provided, as shown, with a plurality of rows of apertures or slots which substantially follow the periphery of the forward portion of the sole portion 52 and provide a plurality of narrow strands 54 and 55 on opposite sides of the forward portion of the sandal. The rear portion of the flange 53 is provided, as shown, with apertures or slots for providing a pair of narrow strands 56 and 57 and a relatively wide heel piece 58, and, as in the previous embodiments, a continuous outer strand 59 is provided extending about the periphery of the sole portion 52 in spaced relation thereto, this continuous strand 59 again being shaded and partially outlined by broken lines for purposes of clarity.

In this embodiment of the invention, however, the continuous strand 59 does not at the rear portion of the sandal constitute the outermost strand provided by the flange 53. Instead, a substantially U-shaped slot or aperture 60 is provided extending around the heel portion of the sandal for defining an ankle engaging strap or strand 61, the purpose of which will become apparent upon a consideration of Figs. 10 and 11. Adjacent the forward end of the sandal, the continuous strand 59 is provided at opposed portions thereof with outwardly extending ears 62 and 63, each of which is provided with a hook or fastening means 64, which is preferably constructed and secured thereto in the manner illustrated in Fig. 9.

Figures 9, 10:
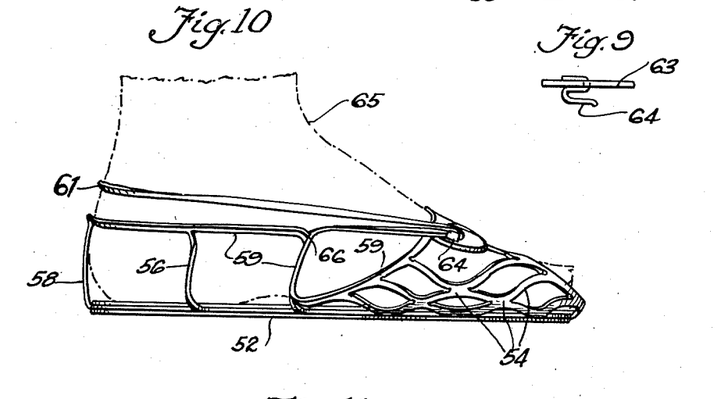
Fig. 9 is a detail view showing one of the fastening means embodied in the sandal of Fig. 8.
Figs. 10 and 11 are respectively side elevational and top plan views of the sandal of Fig. 8 when applied to the foot of a wearer.
Figure 11:
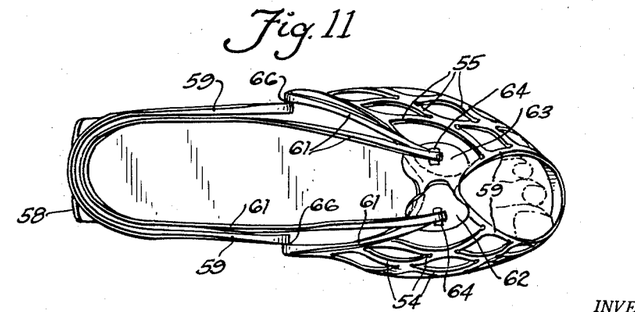

In order to apply the sandal to the foot, it is only necessary, after the foot, which is represented in Fig. 10 by the broken line 65, has been applied to the sole portion 52, to draw the two ears 62 and 63 upward over the toe portion of the foot and to insert the ear 62 through the aperture which is formed between the portion of the continuous strand 59, from which the opposite ear 63 extends, and the next adjacent one of the narrow strands 54, so as to interlock the ears 62 and 63 as shown in Fig. 11. An intermediate portion of the ankle engaging strand 61 may then be grasped on each side of the sandal and drawn forwardly so as to engage the hooks 64, thus to complete the operation of fitting the sandal to the foot. In this embodiment of the invention it will be seen that the continuous strand 59 extends over the instep of the foot and downwardly to a position adjacent the sole portion 52, from which point it again extends upwardly and then rearwardly around the back of the foot, whereby a portion of the continuous strand 59, together with the strand 56, provides an open latticework around the rear portion of the foot, while the strands 54 and 55 provide a rather close latticework at the toe end of the sandal. The heel engaging strand, as shown in Figs. 10 and 11, extends forwardly from the point 66, at which it joins the continuous strand 59 and, after passing through the hooks 64, extend rearwardly around the ankle of the wearer, thus assisting in holding the sandal firmly on the foot of the wearer.

Figure 12:
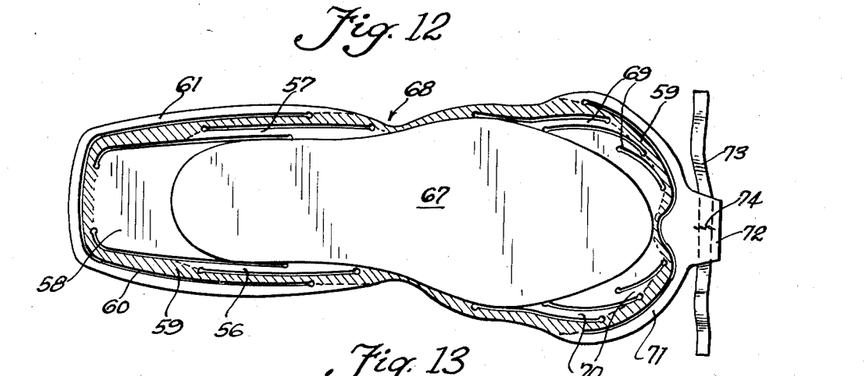
Fig. 12 is a top plan view of still another sandal embodying the present invention in its normal flat condition.

In the embodiment of the invention shown in Fig. 12, the sandal is provided with a sole portion 67 and with a flange portion 68, and it will be observed that, except for the rather square end, the rear portion of the flange 68 is formed to provide a heel engaging latticework and protecting member substantially identical with that disclosed in the embodiment of Figs. 8 to 11. Accordingly, similar reference numerals have been applied in Figs. 12 to 14 to indicate similar parts of the heel structure. The forward portion of the flange 68 in this embodiment of the invention, however, is provided with a plurality of slots or apertures which define a pair of narrow strands on each side of the toe portion, as indicated by the reference numerals 69 and 70, and in addition to the continuous strand 59 which terminates these strands 69 and 70, the toe portion of the flange 68 is provided with an additional outer strand 71 which extends around the toe portion of the sandal and is provided with an outstanding ear 72, to which is secured a ribbon or tie member 73 in any suitable manner, as, for example, by stitching 74.

Figure 13:
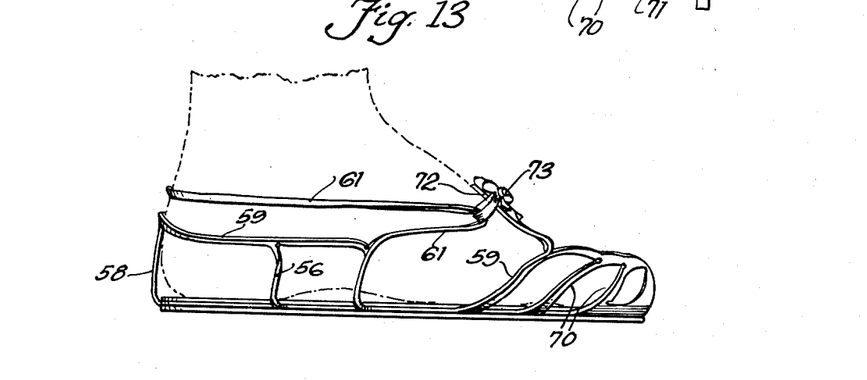
Figs. 13 and 14 are respectively side elevational and top plan views showing the sandal of Fig. 12 applied to the foot.
Figure 14:
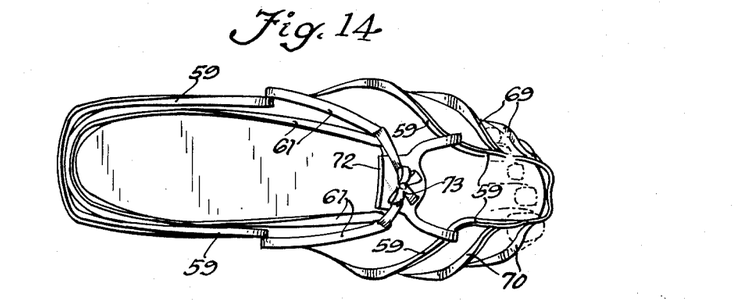

In order to secure the sandal to the foot as shown in Fig. 13, it is only necessary to move the outstanding ear 72 rearwardly over the toe of the foot and to loop the ribbon 73 around intermediate portions of the ankle strap 61 which have been drawn forwardly on opposite sides of the foot as in the previously described embodiment. The ribbon or tie 73 may then be tied in a bow or otherwise secured so as to hold the various strands and straps in foot engaging relation as shown in Figs. 13 and 14.

Figure 15:
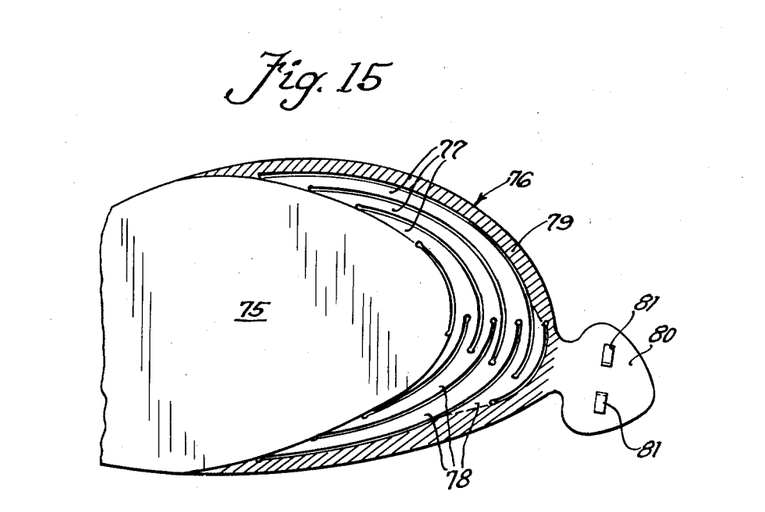
Fig. 15 is a top plan view of the toe portion of still another sandal embodying the present invention in the normal flat condition.
Figure 16:
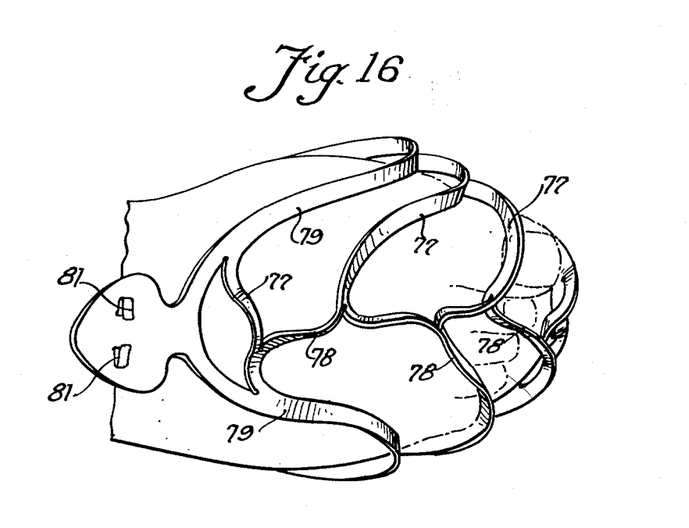
Fig. 16 is a top plan view of the sandal of Fig. 15 when applied to the foot.

In Figs. 15 and 16 only the toe portion of a sandal embodying the invention is illustrated, but it will be understood that the rear or heel portion of the sandal may be formed, if desired, as shown in the embodiments of the invention illustrated in Figs. 8 to 14. In this embodiment of the invention the sole portion 75 is provided with an integral flange portion 76 which surrounds the toe portion of the sandal and which is provided with a plurality of apertures forming narrow curved strands 77 and 78 which extend forwardly from the periphery of the sole portion 75 and inwardly toward each other, the strands 77 and 78 being integrally interconnected forwardly of the toe end of the sole portion. The flange portion 76 likewise includes a continuous outer strand 79, which carries an outstanding ear or lug 80 which may be provided with suitable fastening means such, for example, as hooks 81 similar to those employed in the embodiment of Fig. 8, for example. When the outstanding ear 80 is drawn rearwardly over the top of the foot of the wearer, as shown in Fig. 16, and suitably secured over the arch of the foot, as, for example, by extending an ankle engaging strand similar to the strand 61 of Fig. 8, through the hooks 81, the strands 77 and 78, together with the continuous strand 79, form an attractive latticework which constitutes the toe end of the sandal.

Figure 17:
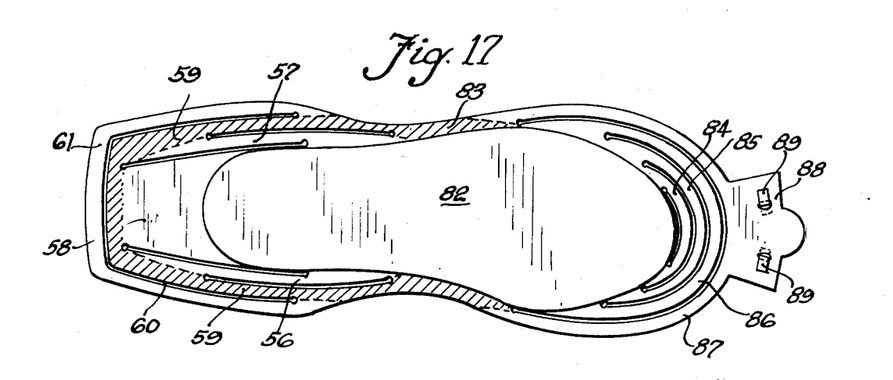
Fig. 17 is a top plan view of another form of sandal embodying the present invention in its normal flat condition.
Figure 18:
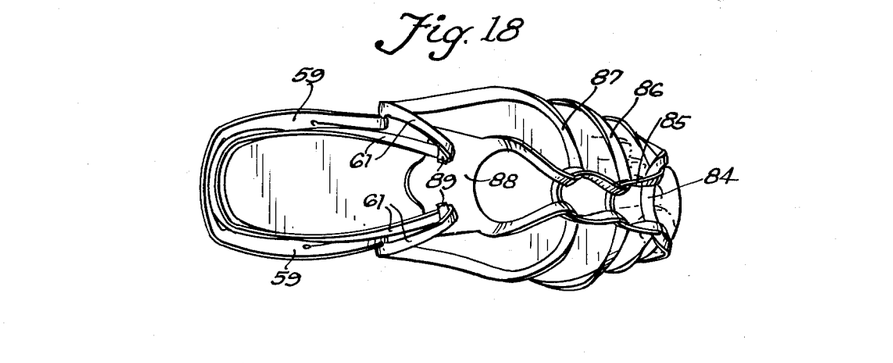
Figs. 18 and 19 are respectively top plan and side elevational views showing the sandal of Fig. 17 in use.
Figure 19:
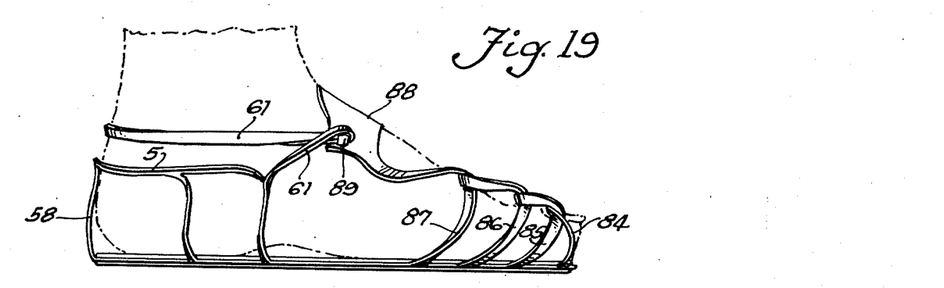

In the embodiment of the invention shown in Figs. 17 to 19, inclusive, the sole portion 82 is provided with a peripheral flange 83 having a heel portion formed substantially as in the embodiment of Fig. 12, similar reference numerals being applied to similar parts, but in this embodiment of the invention the toe end of the flange 83 is apertured or slotted to provide a plurality of narrow strands 84, 85, 86, and 87, which are of gradually increasing length and which have their opposite ends terminating in the periphery of the sole portion 82 on the opposite sides thereof. In order to form the toe structure of the sandal in this embodiment of the invention, the strands 84 to 86 may be formed into a chain stitch by passing each strand through the next shorter strand so as to provide the chain stitch pattern shown in Fig. 19, and the ear or lug 88, which carries the fastening means or hooks 89, may then be secured over the arch of the foot by means of the ankle strap 61 so as to complete the sandal structure.

As will be apparent from the above description, sandals embodying the present invention are characterized by normally flat integral structures which may be readily and inexpensively constructed and which may take a variety of forms, the sandal in each case including toe and heel engaging latticeworks which conform to the foot of the user and which may be readily secured and released to provide for application of the sandal to the foot and removal of the sandal therefrom, the sandal thereupon again assuming its flat condition.

While particular embodiments of the invention have been shown, it will be understood, of course, that the invention is not limited thereto since many modifications may be made and it is therefore contemplated by the appended claims to cover any such modifications as fall within the true spirit and scope of the invention.

What is claimed and desired to be secured by Letters Patent is:

1. A one-piece sandal or like article of footwear comprising a sole portion peripherally shaped to conform to the outline of the foot of a wearer, a plurality of narrow strands integral with said sole portion extending angularly outward from the periphery of said sole portion in the plane thereof, and a continuous outer strand extending about at least a portion of said periphery in spaced relation thereto and integrally terminating said narrow strands at the ends thereof remote from said sole portion.

2. A one-piece sandal or like article of footwear comprising a sole portion peripherally shaped to conform to the outline of the foot of a wearer, a plurality of narrow strands integral with said sole portion extending obliquely outward from the periphery of said sole portion in the plane thereof, and a continuous outer strand extending about at least a portion of said periphery in spaced relation thereto and integrally terminating said narrow strands at the ends thereof remote from said sole portion.

3. A one-piece sandal or like article of footwear comprising a sole portion peripherally shaped to conform to the outline of the foot of a wearer, a first plurality of narrow strands integral with said sole portion and extending obliquely outward and forward from the forward portion of the periphery of said sole portion in the plane thereof, a second plurality of narrow strands integral with said sole portion and extending obliquely outward and rearward from the rearward portion of the periphery of said sole portion in the plane thereof, and a continuous outer strand extending about said periphery in spaced relation thereto and integrally terminating said narrow strands at the ends thereof remote from said sole portion.

4. A one-piece sandal or like article of footwear comprising a sole portion peripherally shaped to conform to the outline of the foot of a wearer, and an integral flange extending outwardly from at least a portion of the periphery of said sole portion and having a continuous outer edge portion, said flange having elongate partially overlapping apertures therein to define a plurality of strands defined by portions of the side edges of said apertures, at least some of said strands terminating at opposite ends thereof in said sole portion and said continuous edge portion.

5. A one-piece sandal or like article of footwear comprising a sole portion shaped to conform to the outline of the foot of a wearer, a plurality of narrow strands integral with said sole portion extending angularly outward from the periphery of said sole portion in the plane thereof, a continuous outer strand extending about at least a portion of said periphery in spaced relation thereto and integrally terminating at least some of said narrow strands at the ends thereof remote from said sole portion, and means for securing spaced portions of said outer strand together over the instep of the wearer whereby said plurality of strands form upwardly extending foot engaging latticeworks.

6. A one-piece sandal or like article of footwear comprising a sole portion shaped to conform to the outline of the foot of a wearer, a plurality of narrow strands integral with said sole portion extending angularly outward from the periphery of said sole portion in the plane thereof, a continuous outer strand extending about at least a portion of said periphery in spaced relation thereto and integrally terminating at least some of said narrow strands, and a hook member secured to said outer strand for engaging a corresponding portion of said outer strand on the opposite side of said sole portion for securing opposed portions of said outer strand together over the arch of the foot whereby said plurality of strands form a foot engaging latticework extending upwardly from said periphery of said sole portion.

7. A one-piece sandal or like article of footwear comprising a sole portion peripherally shaped to conform to the outline of the foot of a wearer, a first plurality of narrow strands integral with said sole portion and extending obliquely outward and forward from the forward portion of the periphery of said sole portion in the plane thereof, a second plurality of narrow strands integral with said sole portion and extending obliquely outward and rearward from the rearward portion of the periphery of said sole portion in the plane thereof, a continuous outer strand extending about said periphery in spaced relation thereto and integrally terminating at least some of said narrow strands, and means for securing together over the foot of the wearer opposed portions of said outer strand intermediate said first and second pluralities of strands whereby said pluralities of strands respectively form toe and heel engaging latticeworks extending upwardly from said periphery.

8. A one-piece sandal or like article of footwear comprising a sole portion peripherally shaped to conform to the outline of the foot of a wearer, an integral flange extending outwardly from at least a portion of the periphery of said sole portion and having a continuous outer edge portion, said flange having elongate partially overlapping apertures therein to define a plurality of strands defined by portions of the said edges of said apertures, at least some of said strands terminating at opposite ends thereof in said sole portion and said continuous edge portion, and means for securing spaced portions of said continuous edge portion together over the foot of the wearer to cause said strands to form an upwardly extending foot engaging latticework.

9. A one-piece sandal or like article of footwear comprising a sole portion peripherally shaped to conform to the outline of the foot of a wearer, a plurality of narrow strands integral with said sole portion extending angularly outward from the periphery of said sole portion in the plane thereof, a continuous outer strand extending about at least a portion of said periphery in spaced relation thereto and integrally terminating said narrow strands, and an ankle engaging strand having its opposed ends integrally joined to the outer edge of said outer strand on opposite sides of said sole portion intermediate the ends of said sole portion and extending parallel to said outer strand around the heel end of said sole portion.

10. A sandal or like article of footwear comprising a sole portion shaped to conform to the outline of the foot of a wearer, a plurality of strands extending angularly outward from the periphery of said sole portion in the plane thereof, a continuous outer strand extending about at least a portion of said periphery in spaced relation thereto and terminating at least some of said narrow strands, an ankle engaging strand surrounding the heel end of said sole portion in substantially parallel relation to said outer strand with the opposed ends thereof terminating in the outer edge of said outer strand on opposite sides of said sole portion, and means for securing spaced portions of said outer strand and said ankle strand together over the instep of the wearer whereby said plurality of strands form upwardly extending foot engaging latticeworks and said ankle strand engages the rear of the ankle of the wearer.

11. A one-piece sandal or like article of footwear comprising a sole portion peripherally shaped to conform to the outline of the foot of a wearer, an integral flange extending outwardly from at least a portion of the periphery of said sole portion and having a continuous outer edge portion, said flange having elongate apertures therein to define a plurality of strands, at least some of said strands terminating at opposite ends thereof in said sole portion and said continuous edge portion, and an ankle engaging strand surrounding the heel end of said flange with the opposed ends thereof terminating in the outer edge of said continuous edge portion on opposite sides of said sole portion intermediate the ends of said sole portion.

12. A one-piece sandal or like article of footwear comprising a sole portion peripherally shaped to conform to the outline of the foot of a wearer, an integral flange extending outwardly from at least a portion of the periphery of said sole portion and having a continuous outer edge portion, said flange having elongate apertures therein to define a plurality of strands, at least some of said strands terminating at opposite ends thereof in said sole portion and said continuous edge portion, an ankle engaging strand surrounding the heel end of said flange with the opposed ends thereof terminating in the outer edge of said continuous edge portion on opposite sides of said sole portion intermediate the ends of said sole portion, and means for securing spaced portions of said ankle engaging strand to said continuous edge portion over the instep of the wearer whereby said plurality of strands form upwardly extending foot engaging latticeworks and said ankle strand is engaged about the ankle of the wearer rearwardly thereof and above said latticeworks.

13. A one-piece sandal or like article of footwear comprising a sole portion peripherally shaped to conform to the outline of the foot of a wearer, a plurality of narrow strands extending outwardly from opposite sides of the periphery of said sole portion in the plane thereof, a pair of wide strands respectively extending outwardly from the heel and toe ends of said sole portion, and a continuous outer strand extending about said periphery in spaced relation thereto and integrally terminating said narrow and wide strands.

14. A one-piece sandal or like article of footwear comprising a sole portion peripherally shaped to conform to the outline of the foot of a wearer, a plurality of narrow strands extending outwardly from opposite sides of the periphery of said sole portion in the plane thereof, a wide strand extending outwardly from one end of said sole portion in the plane thereof, and a continuous outer strand extending about said end and along at least a portion of said sides of said periphery and integrally terminating said narrow and wide strands.

15. A one-piece sandal or like article of footwear comprising a sole portion peripherally shaped to conform to the outline of the foot of a wearer, a plurality of narrow strands extending outwardly from opposite sides of the periphery of said sole portion in the plane thereof, a pair of wide strands respectively extending outwardly from the heel and toe ends of said sole portion, a continuous outer strand extending about said periphery in spaced relation thereto and integrally terminating said narrow and wide strands, and means for securing spaced portions of said outer strand together over the instep of the wearer whereby said narrow strands form foot engaging lattice works extending upwardly along said side of said periphery and said wide strands form upwardly extending heel and toe pieces.

16. A one-piece sandal or like article of footwear comprising a sole portion peripherally shaped to conform to the outline of the foot of a wearer, a plurality of narrow strands extending outwardly from opposite sides of the periphery of said sole portion in the plane thereof, a wide strand extending outwardly from one end of said sole portion in the plane thereof, a continuous outer strand extending about said end and along at least a portion of said sides of said periphery and integrally terminating said narrow and wide strands, and means for securing spaced portions of said outer strand together over the foot of the wearer to cause said narrow strands to form upwardly extending latticeworks and said wide strand to form an upwardly extending protective end-piece.

17. In a one-piece sandal or like article of footwear, a sole portion peripherally shaped to conform to the outline of the foot of a wearer, a plurality of narrow strands formed integrally with said sole portion and extending forwardly in the plane thereof from opposite sides of the toe end of said sole portion, said strands on said opposite sides being curved inwardly toward each other and interconnected forwardly of said toe end, the outermost ones of said strands on each side cooperating to form a continuous strand, and means extending from said outermost strand for drawing a central portion of said continuous strand rearwardly over the foot of a wearer for securement over the instep of the foot, whereby said interconnected strands form a latticework overlying the toe portion of the foot.

18. In a one-piece sandal or like article of footwear, a sole portion peripherally shaped to conform to the outline of the foot of a wearer, a plurality of narrow strands formed integrally with said sole portion and extending forwardly in the plane of said sole portion from the toe end thereof, said strands being of gradually increasing length and each of said strands having its opposite ends terminating in the periphery of said sole portion on opposite sides thereof, whereby a central portion of each of said strands may be passed through the next strand inwardly thereof to form a chain-stitch latticework, and means for securing the central portion of the outermost one of said strands over the instep of the foot whereby said chain-stitch latticework overlies the toe portion of the foot.

HARRY A. WEBB.

REFERENCES CITED

The following references are of record in the file of this patent:

UNITED STATES PATENTS

| Number | Name | Date |
|---|---|---|
| D. 94,638 | Stritter | Feb. 19, 1935 |
| 1,386,684 | Bradford | Aug. 9, 1911 |
| 2,112,884 | Gillette | Apr. 5, 1938 |
| 2,390,685 | Benson | Dec. 11, 1945 |

FOREIGN PATENTS

| Number | Country | Date |
|---|---|---|
| 393,905 | Great Britain | June 15, 1933 |
| 399,935 | Great Britain | Oct. 19, 1933 |
| 428,127 | Great Britain | Apr. 26, 1935 |